US012760674B2

(12) United States Patent
Collura

(10) Patent No.: US 12,760,674 B2
(45) Date of Patent: Oct. 13, 2026

(54) EXHAUST GAS AFTERTREATMENT SYSTEM FOR AN AMMONIA FUELED INTERNAL COMBUSTION ENGINE

(71) Applicant: Liebherr-Components Colmar SAS, Colmar Cedex (FR)

(72) Inventor: Salvatore Collura, Luttenbach (FR)

(73) Assignee: LIEBHERR-COMPONENTS COLMAR SAS, Colmar Cedex (FR)

( * ) Notice: Subject to any disclaimer, the term of this patent is extended or adjusted under 35 U.S.C. 154(b) by 0 days.

(21) Appl. No.: 19/065,434

(22) Filed: Feb. 27, 2025

(65) Prior Publication Data

US 2025/0277466 A1 Sep. 4, 2025

(30) Foreign Application Priority Data

Mar. 1, 2024 (DE) .................... 10 2024 105 998.2

(51) Int. Cl.
*F01N 3/10* (2006.01)
*F01N 3/20* (2006.01)
(Continued)

(52) U.S. Cl.
CPC ............. *F01N 3/208* (2013.01); *F01N 3/108* (2013.01); *F01N 3/206* (2013.01); *F01N 3/2066* (2013.01); *F01N 13/0093* (2014.06); *F02M 21/0206* (2013.01); *F01N 2560/021* (2013.01); *F01N 2560/026* (2013.01); *F01N 2560/14* (2013.01);
(Continued)

(58) Field of Classification Search
CPC .......... F01N 3/208; F01N 3/108; F01N 3/206; F01N 3/2066; F01N 13/0093; F01N 2560/021; F01N 2560/026; F01N 2560/14; F01N 2610/02; F01N 2610/1453;
(Continued)

(56) References Cited

U.S. PATENT DOCUMENTS 8,646,259 B2 * 2/2014 Gonze .................. F01N 11/002 60/303
9,410,459 B2 8/2016 Pease et al.
(Continued)

FOREIGN PATENT DOCUMENTS

DE 102017122001 A1 3/2018
DE 102018110452 A1 7/2018
(Continued)

OTHER PUBLICATIONS

European Patent Office, Extended European Search Report Issued in Application No. 25160299.1, Jun. 13, 2025, Germany, 8 pages.

*Primary Examiner* — Dapinder Singh
(74) *Attorney, Agent, or Firm* — McCoy Russell LLP

(57) ABSTRACT

The present disclosure provides an exhaust gas aftertreatment system for an ammonia fueled internal combustion engine comprising: a passive SCR catalyst system arranged downstream of the engine, the passive SCR catalyst system comprising an SCR catalyst and no reductant injection system, and an active SCR catalyst system arranged downstream of the passive SCR catalyst system, the active SCR catalyst system comprising an SCR catalyst, a first NOx sensor and a reductant injection system, the reductant injection system comprising a reductant injector and a controller controlling reductant injection based on an NOx concentration measured by the first NOx sensor.

19 Claims, 4 Drawing Sheets

(51) Int. Cl.
*F01N 13/00* (2010.01)
*F02M 21/02* (2006.01)

(52) U.S. Cl.
CPC .. *F01N 2610/02* (2013.01); *F01N 2610/1453* (2013.01); *F01N 2610/146* (2013.01); *F01N 2900/1616* (2013.01); *F01N 2900/1812* (2013.01)

(58) Field of Classification Search
CPC ....... F01N 2610/146; F01N 2900/1616; F01N 2900/1812; F02M 21/0206
See application file for complete search history.

(56) References Cited

U.S. PATENT DOCUMENTS

| | | | | |
|---|---|---|---|---|
| 9,528,413 | B2 | 12/2016 | Katare et al. | |
| 11,890,575 | B2 * | 2/2024 | Sung | B01J 29/68 |
| 12,241,398 | B2 * | 3/2025 | Haas | F01N 3/108 |
| 2006/0010857 | A1 | 1/2006 | Hu et al. | |
| 2007/0012032 | A1 * | 1/2007 | Hu | F01N 3/0842 60/301 |
| 2011/0011065 | A1 * | 1/2011 | Knuth | F01N 3/106 60/295 |
| 2013/0042597 | A1 * | 2/2013 | Gonze | F01N 3/2013 60/274 |
| 2015/0273393 | A1 * | 10/2015 | Devarakonda | B01D 53/9477 423/212 |
| 2017/0107878 | A1 | 4/2017 | Brown et al. | |
| 2019/0301334 | A1 * | 10/2019 | Arulraj | B01J 37/0244 |
| 2021/0387145 | A1 * | 12/2021 | Maurer | B01J 37/0248 |
| 2022/0105493 | A1 * | 4/2022 | Liu | B01J 37/0215 |
| 2022/0154620 | A1 * | 5/2022 | Kumamoto | B01J 29/76 |
| 2022/0162971 | A1 * | 5/2022 | Montgomery | F01N 3/0842 |

FOREIGN PATENT DOCUMENTS

| | | | | |
|---|---|---|---|---|
| DE | 102022117569 | A1 | 1/2024 | |
| EP | 2339136 | B1 | 8/2013 | |
| EP | 2783741 | B1 | 3/2021 | |
| GB | 2556187 | A | 5/2018 | |
| WO | 2023102590 | A1 | 6/2023 | |
| WO | WO-2024012792 | A1 * | 1/2024 | F01N 3/103 |

* cited by examiner

Prior art

EXHAUST GAS AFTERTREATMENT SYSTEM FOR AN AMMONIA FUELED INTERNAL COMBUSTION ENGINE

CROSS REFERENCE TO RELATED APPLICATION

The present application claims priority to German Patent Application No. 10 2024 105 998.2 filed on Mar. 1, 2024. The entire contents of the above-listed application are hereby incorporated by reference for all purposes.

TECHNICAL FIELD

The present disclosure relates to an exhaust gas aftertreatment system for an ammonia fueled internal combustion engine.

BACKGROUND

The use of ammonia as fuel in internal combustion engines has been contemplated for some time, and there are some examples where ammonia has been actually used as fuel on a larger scale. For example, ammonia has been used in internal combustion engines during the Second World War in Belgium because of a shortage of gasoline. During this period, the public buses have been converted to run on ammonia and coal gas. Further, in the 1980s and more recently in the early 2000s, trials have been done with passenger cars but no commercial applications from this trials have been made.

SUMMARY

Nowadays, engine manufacturers are looking at CO2 free fuels and ammonia is seen as a viable maritime fuel, where successful projects have been demonstrated. However, little is known about the technologies that can be used for emissions control of ammonia fueled engines.

In principle, some of the available technologies could be used to control the emissions by running the engine either lean or stoichiometric. In the case of lean burn engines, one of these technologies could be the use of the available ammonia as a reducing agent for an active SCR catalyst.

SCR catalysts are used to control the NOx emissions from lean burn combustion engines, mainly Diesel engines, by adding a reducing agent such as urea or ammonia upstream of these catalysts. These catalysts are often used with an ASC (ammonia slippage catalyst) in order to control the ammonia excess slipping from the SCR catalysts.

In a conventional SCR based exhaust aftertreatment systems (2) such as shown in FIG. 1, the NOx engine out exiting the engine (1) is determined using a dedicated NOx sensor (9) upstream of the SCR catalytic converter (6) composed of a SCR catalyst (4) and an optional ASC (5). Depending of the efficiency requested by the control unit (3) for a given temperature measured by a temperature sensor (10) close to the injection device (8), a metered reductant amount, for example ammonia, is injected in the exhaust system, usually in front of a mixing device (7) to reduce the NOx amount to a designed target over the SCR catalyst. Downstream NOx and NH3 sensors (respectively 10 and 11) are used by the control unit (3) to reach the required efficiency and avoiding any ammonia slip, see for example EP2339136 and U.S. Pat. No. 9,410,459. The mixing device (7) can be part of the SCR catalytic converter (6). In some applications, instead of using reductant injection, Lean NOx Traps (LNT) were used to produce ammonia for the SCR reaction, such as in EP2783741 and US20060010857.

When ammonia is used as fuel alone or with a fuel promoter, the internal combustion engine emits a very large amount of unburned ammonia ($NH_3$) and nitrogen oxides (NOx). The amount and the ratio of these pollutants depend on the combustion richness and composition (when a combustion promoter is used). FIG. 2 illustrates the influence of the lambda and the promoter content on the ANR.

Therefore, for ammonia lean burn engines, where ammonia is used as single fuel or together with a combustion promoter (hydrogen, Diesel fuel, gasoline fuel, . . . ), because the NOx engine out can be as high as 8000 ppm and because of the presence of even higher unburned ammonia quantity, it is not possible to measure the NOx engine out. The current NOx sensor range is not high enough and even if this technical barrier is solved, the ammonia presence makes the NOx sensor reading very difficult because of the ammonia cross sensitivity. Therefore, it is not possible to use a conventional SCR system layout (FIG. 1) like it is done on Diesel engine.

The object of the present disclosure therefore is to provide an exhaust gas aftertreatment system that can be used for an ammonia fueled internal combustion engine.

This object is solved by an exhaust gas aftertreatment system as described herein.

The present disclosure provides an exhaust gas aftertreatment system for an ammonia fueled internal combustion engine comprising: a passive SCR catalyst system arranged downstream of the engine, the passive SCR catalyst system comprising an SCR catalyst and no reductant injection system, and an active SCR catalyst system arranged downstream of the passive SCR catalyst, the active SCR catalyst system comprising an SCR catalyst, a first NOx sensor and a reductant injection system, the reductant injection system comprising a reductant injector and a controller controlling reductant injection based on an NOx concentration measured by the first NOx sensor.

According to the present disclosure, since $NH_3$ is a good reducing agent for a SCR catalyst, the excess unburned $NH_3$ in the exhaust gas exiting the engine is used to reduce the NOx engine out using a passive SCR catalyst, i.e. an SCR catalyst operated without reducing agent injection. Thereby, the amount of NOx and ammonia contained in the exhaust gas is reduced such that a commercially available NOx sensor can be used to measure accurately the NOx remaining in the exhaust gas and inject the corresponding amount of reductant in the active SCR catalyst system.

In an embodiment of the present disclosure, the SCR catalyst of the passive SCR catalyst system is arranged downstream of an engine exhaust manifold as the first exhaust gas aftertreatment component acting on the NH3 and/or NOx content of the exhaust gas, and optionally as the first exhaust gas aftertreatment component. Therefore, contrary to prior art solutions for some diesel engines, no LNT is arranged between the engine and the passive SCR catalyst.

In an embodiment of the present disclosure, the passive SCR catalyst system is arranged downstream of an engine exhaust manifold such that NH3 slippage in the exhaust gas of the engine is used to reduce NOx contained in the exhaust gas of the engine in the SCR catalyst of the passive SCR catalyst system.

In an embodiment of the present disclosure, an ammonia slip catalyst is provided downstream of SCR catalyst of the passive SCR catalyst system and upstream of the active SCR catalyst system, wherein the ammonia slip catalyst is optionally arranged upstream of the first NOx sensor of the active SCR catalyst system. The ammonia slip catalyst may form a unit with the passive SCR catalyst.

In an embodiment of the present disclosure, the ammonia slip catalyst is arranged such that NH3 still contained in the exhaust gas exiting the SCR catalyst of the passive SCR catalyst system is converted into NOx and/or N2. Thereby, the active SCR system can operate in the same way as it would on any diesel engine, because no or almost no NH3 is contained in the exhaust gas before reductant is injected by the active SCR catalyst system.

In an embodiment of the present disclosure, a second ammonia slip catalyst is arranged downstream of the SCR catalyst of the active SCR catalyst system. The second ammonia slip catalyst may form a unit with the SCR catalyst of the active SCR catalyst system.

In an embodiment of the present disclosure, the controller is configured to feedback control the reductant injection of the active SCR catalyst system using a closed loop control strategy based on the NOx concentration measured by a second NOx sensor and/or the NH3 concentration measured by an NH3 sensor.

In an embodiment of the present disclosure, the second NOx sensor and/or the NH3 sensor is arranged downstream of the active SCR catalyst system.

In an embodiment of the present disclosure, the controller receives a temperature value of the exhaust gas measured by a temperature sensor and/or a first NOx value measured by the first NOx sensor arranged downstream of the passive SCR catalyst system and upstream of the reductant injector of the active SCR catalyst system.

In an embodiment of the present disclosure, the controller is configured to feedforward control the reductant injection of the active SCR catalyst system based on the NOx concentration measured by the first NOx sensor.

In an embodiment of the present disclosure, the first NOx sensor and/or the temperature sensor arranged downstream of the passive SCR catalyst system and upstream of the reductant injector of the active SCR catalyst system.

In an embodiment of the present disclosure, the exhaust gas aftertreatment system comprises at least one turbocharger.

The active SCR catalyst system can be located upstream or downstream of the turbocharger or turbochargers.

Optionally, the active SCR catalyst system is arranged downstream of the turbocharger in the exhaust gas stream.

In an embodiment of the present disclosure, the passive SCR catalyst system is arranged upstream or downstream of the at least one turbocharger.

In an embodiment of the present disclosure, the exhaust gas aftertreatment system comprises a single exhaust piping or multiple exhaust pipings arranged in parallel. The multiple exhaust pipings can be multiple exhaust lines located after each engine turbocharger or after an exhaust collector.

In an embodiment of the present disclosure, the exhaust gas aftertreatment system comprises a plurality of active SCR systems each including at least one NOx sensor and a reducing agent injector.

In an embodiment of the present disclosure, the exhaust gas aftertreatment system comprises a plurality of passive SCR catalyst systems.

In an embodiment of the present disclosure, the exhaust gas aftertreatment system comprises a plurality of passive SCR catalyst systems and a single active SCR catalyst system.

The size of the two SCR catalyst systems, passive and active, will depend of the engine out emissions and the tailpipe emissions requirements.

In an embodiment of the present disclosure, the passive SCR catalyst system is between 2 to 5 times bigger than the active SCR catalyst system. If a plurality of passive SCR catalyst systems and/or active SCR catalyst systems are provided, this size requirement refers to the size of the entirely of passive SCR catalyst systems and/or active SCR catalyst systems. The size requirement optionally relate to the volume of the SCR catalysts of the respective SCR catalyst systems.

Such a sizing is in particular useful for a lean burn ammonia engine and low combustion promoter amount, such as a combustion promoter amount between 2% and 10%.

In an embodiment of the present disclosure, at least one of the SCR catalysts has a filtration function to trap particulate matters emitted by the engine, i.e. is a SCRF catalyst.

As opposed to fossil fuel engines or carbon based fuel engines, ammonia fueled engine are not producing fuel particulate matters (PM), but the oil consumption can lead to oil PM formation that can be controlled by providing either the passive SCR as a passive SCRF (particulate filter coated with SCR formulation) or the active SCR as an active SCRF.

In an embodiment of the present disclosure, the SCR catalysts are vanadium based, zeolite based and/or mixed oxide based.

In an embodiment of the present disclosure, at least one ammonia slip catalyst comprises ruthenium and/or a ruthenium mixture.

The reducing agent can be ammonia, a urea water solution, hydrocarbons or hydrogen but an optional reducing agent is ammonia which is available as fuel for the ammonia fueled engine.

In an embodiment of the present disclosure, the reductant used by the reductant injection system of the active SCR catalyst system therefore is ammonia.

In an embodiment of the present disclosure, an ammonia tank and ammonia supply lines providing ammonia from the ammonia tank for operating the internal combustion engine and for operating the reductant injection system of the active SCR catalyst system are provided.

In an embodiment of the present disclosure, the reducing agent injection device is an injector with a solenoid.

In an embodiment of the present disclosure, the reducing agent injection device is an injector with an injection tube with a metering device located away from the exhaust pipe.

There can be several reducing agent injection devices per active SCR system.

The present disclosure further comprises an ammonia fueled internal combustion engine comprising an exhaust gas aftertreatment system as described above.

In an embodiment of the present disclosure, the ammonia fueled internal combustion engine is configured to burn ammonia as a single fuel and/or ammonia in combination with a combustion promoter.

The present disclosure further comprises a method for operating an ammonia fueled internal combustion engine as described above, the method comprising:

operating the engine with ammonia as a fuel, using NH3 slippage in the exhaust gas of the engine to reduce NOx contained in the exhaust gas of the engine in the SCR catalyst of the passive SCR catalyst system;

measuring NOx content in the exhaust gas downstream of the passive SCR catalyst system, controlling reductant injection into the exhaust gas stream upstream of the SCR catalyst of the active SCR catalyst system based on the NOx content and reducing NOx contained in the exhaust gas with the reductant in the SCR catalyst of the active SCR catalyst system.

The present disclosure will now be described using drawings and embodiments.

DETAILED DESCRIPTION

Figure 1:
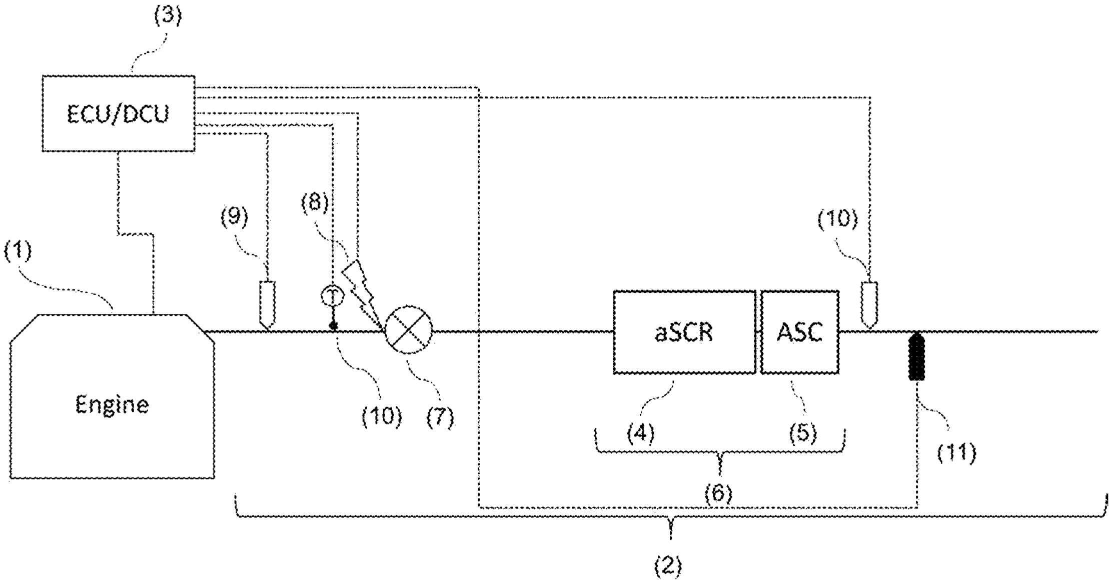
FIG. 1 an embodiment of a prior art exhaust gas aftertreatment system of a diesel engine, FIG. 2 a diagram showing the ammonia NOx ration (ANR) in dependence on the lambda value and the promoter content (for a promoter content of 5%, 25% and 50%), FIG. 3 an embodiment of an inventive exhaust gas aftertreatment system of an ammonia fueled engine and FIG. 4 the working principle of the inventive exhaust gas aftertreatment system and the corresponding method.
Figure 2:
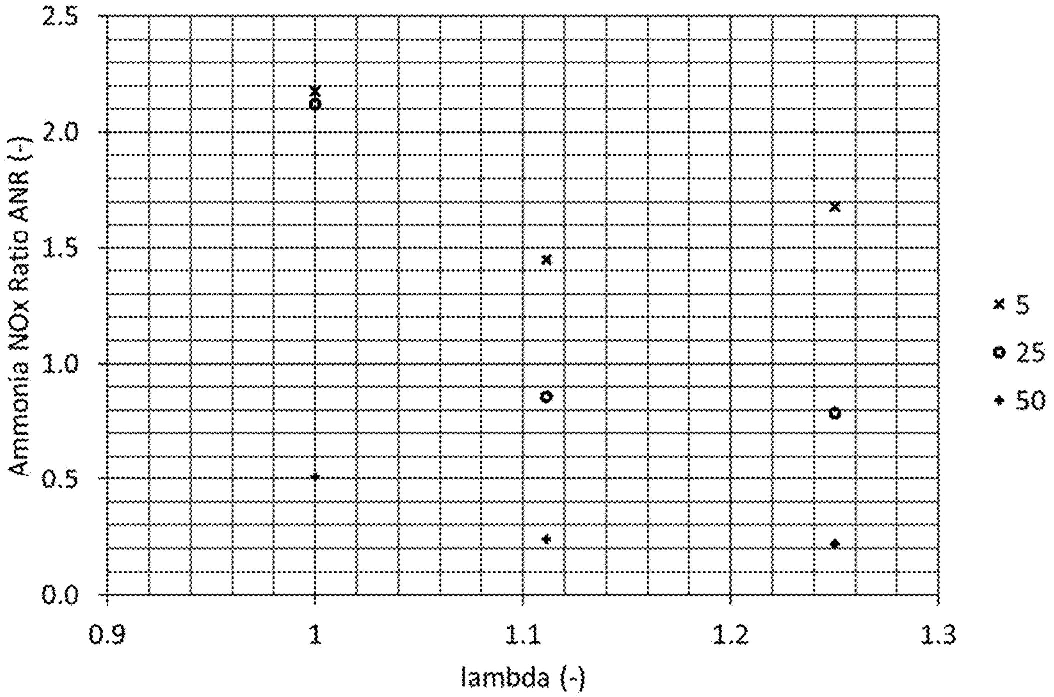
Figure 3:
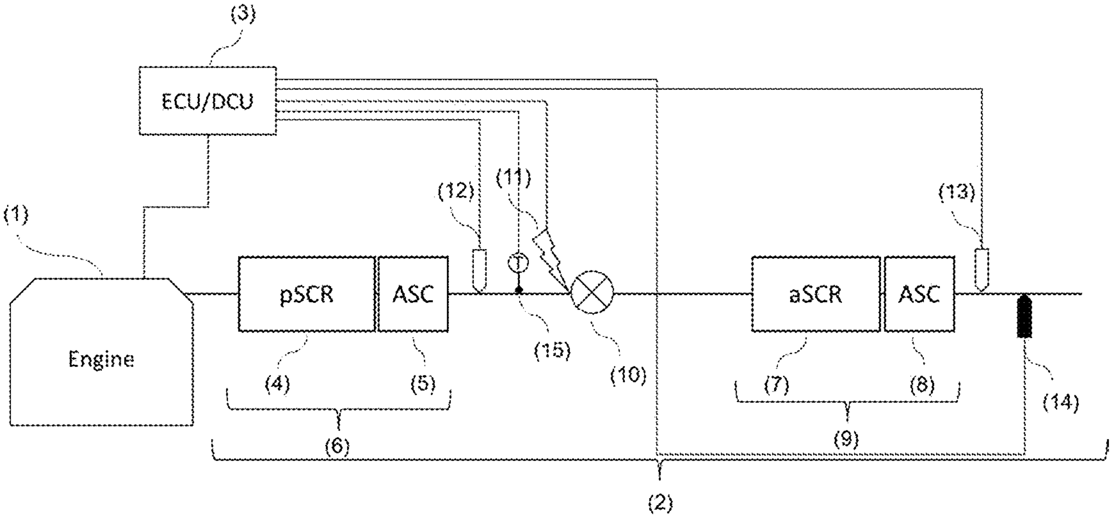

FIG. 3 shows an embodiment of an inventive exhaust gas aftertreatment system for the ammonia fueled engine (1).

The exhaust gas aftertreatment system comprises a first passive SCR system (6) comprising a first SCR catalyst (4) directly after the engine (1) and operated without reductant injection, and a second, active SCR system (9) located downstream of the first SCR system (6). In the first SCR system (6), the engine out NOx are directly converted using the unburned ammonia from the engine using the passive SCR catalyst (4). The ammonia excess, if any, is then converted to NOx and $N_2$ using the ASC (5) located in the first SCR system (6).

The NOx emissions as formed are then determined using an upstream NOx sensor (12) located downstream of the first SCR system (6) and upstream of the second SCR system (9). The NOx concentration is used by the control unit (3) to determine the required ammonia, or reducing agent, to be injected in the exhaust system (2) by the reductant injector (11). The correctly metered amount of reducing agent is then mixed in the exhaust system mixer (10) and used by the second active SCR system (9) within the SCR catalyst (7).

The reducing agent injection is controlled using a closed loop control strategy involving the use of a temperature sensor (15), a downstream NOx sensor (13) and a downstream $NH_3$ sensor (14) in order to ensure high efficiency by limiting the ammonia slip. The ammonia slip can also be prevented by the use of a second ASC (8) located in the second SCR system (9).

Figure 4:
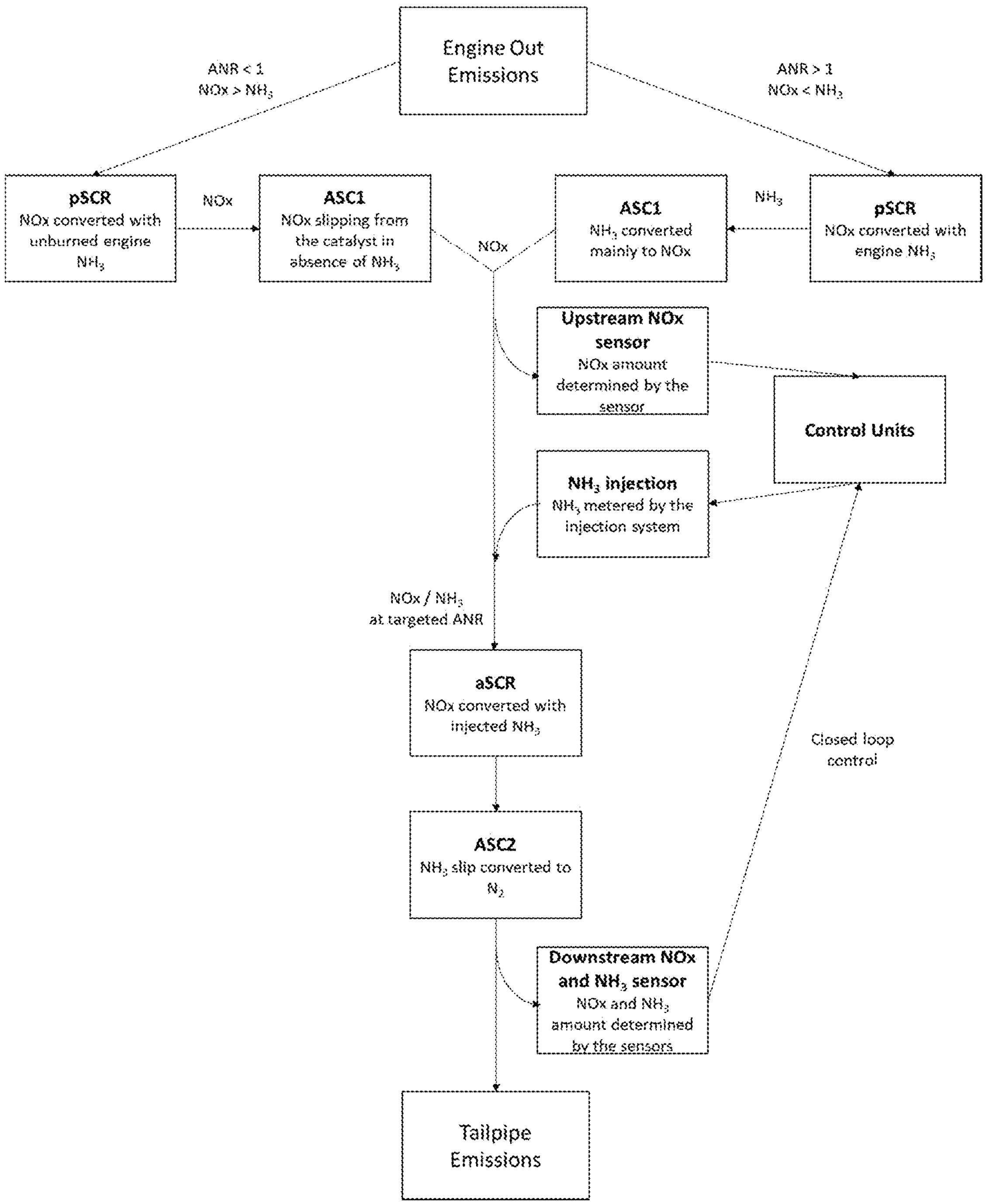

The working principle of the proposed EATS is described by the FIG. 4.

The Engine Out Emissions are first treated in the passive SCR (pSCR), where the NOx in the engine out emissions is converted with unburned engine NH3, and then enter the ASC1 arranged downstream of the pSCR. If ANR<1 and therefore NOx>NH3, some NOx will remain after the pSCR, which will slip through the ASC1 arranged downstream of the pSCR. If ANR>1 and therefore NOx<NH3, some NH3 will remain after the pSCR, which is converted in the ASC1 mainly into NOx.

In any case, the exhaust gases leaving the first SCR system (6) will be essentially free of NH3 and will comprise some NOx.

The NOx concentration in the exhaust gases leaving the first SCR system (6) is determined by the upstream NOx sensor (12), and the control unit will control the NH3 injection of the injection system (11) such that the ammonia to NOx ratio in the exhaust gas stream is at a target value when the exhaust gas stream enters the active SCR catalyst (7) of the second SCR system (9). In the active SCR catalyst (7), the NOx is converted with the injected NH3. In the ASC2 (8) arranged downstream of the aSCR (7), the NH3 slip is converted into N2.

The downstream NOx and NH3 sensors (13) and (14) determine the NOx and NH3 concentration in the exhaust gas exiting the second SCR system (9), which the values determined by the downstream NOx and NH3 sensors (13) and (14) being used by the control unit (3) in a closed loop control for the control of the reductant injector (11).

In the following, some further details regarding the configuration of the inventive exhaust gas aftertreatment system are presented:

The passive SCR system (6) can be located upstream or downstream of the engine turbochargers.

The active SCR system (9) can be located upstream or downstream of the engine turbochargers, but optionally downstream of the engine turbochargers.

One of the SCR catalysts (4 or 7) can have a filtration function to trap the particulate matters emitted by the engine (coming from the oil ashes or the soot when Diesel fuel is used as a promoter).

As opposed to fossil fuel engines or carbon based fuel engines, ammonia fueled engines are not producing fuel particulate matters (PM), but the oil consumption can lead to oil PM formation that can be controlled by providing either the passive SCR as a passive SCRF (particulate filter coated with SCR formulation) or the active SCR as an active SCRF.

The SCR catalysts formulation could be vanadia based, zeolite based or mixed oxide based.

It is important that the first ASC (5) formulation enables the oxidation of ammonia to nitrogen oxide at a very high conversion rate. This catalyst is not required to have a NOx reduction capability.

One the other side, the second ASC (8) should be able to convert the ammonia excess to N2.

Both ASC catalyst formulation should prevent the formation of $N_2O$ and if possible reduce the $N_2O$ emissions using ruthenium or a ruthenium mixture, such as shown in GB2556187A. The latter can be particularly important for the second ASC (8) if the $N_2O$ upstream of this catalyst is above a required target.

The disclosure can be applied to single exhaust piping or on multiple exhaust piping. The multiple exhaust piping can be multiple exhaust lines located after each engine turbocharger or after an exhaust collector.

It is also possible to have a single passive SCR system and several active SCR systems including sensors, mixers and reducing agent injectors. It is also possible to have several passive SCR systems and a single active SCR system.

The reducing agent can be ammonia, a urea water solution, hydrocarbons or hydrogen, but an optional reducing agent is ammonia which is available as fuel for the ammonia fueled engine.

The reducing agent injection device can be an injector with a solenoid but optionally an injection tube with a metering device located away from the exhaust pipe. There can be several reducing agent injection device per active SCR system.

The size of the two SCR systems, passive and active, will depend of the engine out emissions and the tailpipe emissions requirements. However, with lean burn ammonia engines and very low combustion promoter amount, the passive SCR system (6) shall be between 2 to 5 times bigger than the active SCR system (9).

The invention claimed is:

1. An exhaust gas aftertreatment system for an ammonia fueled internal combustion engine comprising:

a passive SCR catalyst system arranged downstream of the engine, the passive SCR catalyst system comprising an SCR catalyst and no reductant injection system, an active SCR catalyst system arranged downstream of the passive SCR catalyst system, the active SCR catalyst system comprising an SCR catalyst, a first NOx sensor and a reductant injection system, the reductant injection system comprising a reductant injector and a controller controlling reductant injection based on an NOx concentration measured by the first NOx sensor, and wherein the passive SCR catalyst system is between 2 to 5 times bigger than the active SCR catalyst system.

2. The exhaust gas aftertreatment system of claim 1, wherein the SCR catalyst of the passive SCR catalyst system is arranged downstream of an engine exhaust manifold as a first exhaust gas aftertreatment component acting on the NH3 and/or NOx content of the exhaust gas.

3. The exhaust gas aftertreatment system of claim 2, wherein the SCR catalyst of the passive SCR catalyst system is arranged as the first exhaust gas aftertreatment component.

4. The exhaust gas aftertreatment system of claim 1, wherein the passive SCR catalyst system is arranged downstream of an engine exhaust manifold such that NH3 slippage in the exhaust gas of the engine is used to reduce NOx contained in the exhaust gas of the engine in the SCR catalyst of the passive SCR catalyst system.

5. The exhaust gas aftertreatment system of claim 1, wherein the ammonia slip catalyst is provided downstream of the SCR catalyst of the passive SCR catalyst system and upstream of the active SCR catalyst system.

6. The exhaust gas aftertreatment system of claim 5, wherein the ammonia slip catalyst is arranged such that NH3 still contained in the exhaust gas exiting SCR catalyst of the passive SCR catalyst system is converted into NOx and/or N2.

7. The exhaust gas aftertreatment system of claim 5, wherein the ammonia slip catalyst is arranged upstream of the first NOx sensor of the active SCR catalyst system.

8. The exhaust gas aftertreatment system of claim 1, wherein the ammonia slip catalyst is arranged downstream of the SCR catalyst of the active SCR catalyst system.

9. The exhaust gas aftertreatment system of claim 1, wherein the controller is configured to feedback control the reductant injection of the active SCR catalyst system using a closed loop control strategy based on the NOx concentration measured by a second NOx sensor and/or the NH3 concentration measured by an NH3 sensor.

10. The exhaust gas aftertreatment system of claim 9, wherein the second NOx sensor and/or the NH3 sensor is arranged downstream of the active SCR catalyst system.

11. The exhaust gas aftertreatment system of claim 10, wherein the controller receives a temperature value of the exhaust gas measured by a temperature sensor and/or a first NOx value measured by the first NOx sensor arranged downstream of the passive SCR catalyst system and upstream of the reductant injector of the active SCR catalyst system.

12. The exhaust gas aftertreatment system of claim 1, further comprising at least one turbocharger, wherein the active SCR catalyst system is arranged downstream of the turbocharger in the exhaust gas stream.

13. The exhaust gas aftertreatment system of claim 1, wherein a reductant used by the reductant injection system of the active SCR catalyst system is ammonia.

14. The exhaust gas aftertreatment system of claim 13, wherein an ammonia tank and ammonia supply lines providing ammonia for operating the internal combustion engine and for operating the reductant injection system are provided.

15. An ammonia fueled internal combustion engine comprising the exhaust gas aftertreatment system of claim 1.

16. A method for operating the ammonia fueled internal combustion engine of claim 15, the method comprising:

operating the engine with ammonia as a fuel, using NH3 slippage in the exhaust gas of the engine to reduce NOx contained in the exhaust gas of the engine in the SCR catalyst of the passive SCR catalyst system;

measuring NOx content in the exhaust gas downstream of the passive SCR catalyst system, controlling reductant injection into the exhaust gas stream upstream of the SCR catalyst of the active SCR catalyst system based on the NOx content and reducing NOx contained in the exhaust gas with the reductant in the SCR catalyst of the active SCR catalyst system.

17. The exhaust gas aftertreatment system of claim 15, wherein the ammonia fueled internal combustion engine is configured to burn ammonia as a single fuel and/or ammonia in combination with a combustion promoter.

18. The exhaust gas aftertreatment system of claim 1, wherein the ammonia slip catalyst prevents formation of $N_2O$ and reduces $N_2O$ emissions.

19. The exhaust gas aftertreatment system of claim 1, comprising at least one ammonia slip catalyst, the ammonia slip catalyst comprising ruthenium and/or a ruthenium mixture.

* * * * *